(12) United States Patent
Thompson (10) Patent No.: US 12,394,962 B2
(45) Date of Patent: Aug. 19, 2025

(54) CONDUIT CONNECTION SYSTEM

(71) Applicant: Electrix International Ltd, Durham (GB)

(72) Inventor: Christopher Thompson, Durham (GB)

(73) Assignee: Electrix International Ltd (GB)

( * ) Notice: Subject to any disclaimer, the term of this patent is extended or adjusted under 35 U.S.C. 154(b) by 199 days.

(21) Appl. No.: 18/068,853

(22) Filed: Dec. 20, 2022

(65) Prior Publication Data
US 2023/0208120 A1  Jun. 29, 2023

(30) Foreign Application Priority Data
Dec. 24, 2021 (GB) ...................................... 2118999

(51) Int. Cl.
*H02G 3/06* (2006.01)
*H02G 15/013* (2006.01)
*H02G 15/04* (2006.01)
*H02G 15/18* (2006.01)

(52) U.S. Cl.
CPC ......... *H02G 3/0691* (2013.01); *H02G 15/013* (2013.01); *H02G 15/04* (2013.01); *H02G 15/18* (2013.01)

(58) Field of Classification Search
None
See application file for complete search history.

(56) References Cited

U.S. PATENT DOCUMENTS

| | | | |
|---|---|---|---|
| 1,793,455 A | 2/1931 | Buchanan | |
| 2,201,372 A * | 5/1940 | Miller | F16L 37/0845 285/337 |
| 3,135,537 A | 6/1964 | Scott | |
| 3,381,082 A * | 4/1968 | Peterson | H02G 15/013 174/93 |
| 3,838,205 A * | 9/1974 | Kish | H01R 4/26 174/370 |
| 4,262,167 A * | 4/1981 | Bossard | H02G 15/10 174/92 |

(Continued)

FOREIGN PATENT DOCUMENTS

| | | | |
|---|---|---|---|
| AU | 8551680 A * | 7/1986 | ........... H02G 15/013 |
| CA | 2707276 A1 | 12/2010 | |

(Continued)

OTHER PUBLICATIONS

Original and Translation of CN108351056 (Year: 2018).*
Original and Translation of JPH10334967 (Year: 1998).*

*Primary Examiner* — Timothy J. Dole
*Assistant Examiner* — Muhammed Azam
(74) *Attorney, Agent, or Firm* — The Belles Group, P.C.

(57) ABSTRACT

A conduit connection system has a connecting member for connecting two or more sections of conduit and a plurality of engaging members designed to establish both mechanical and electrical connections between the conduit sections and the connecting member. The system includes a first sleeve, equipped with a seal to ensure a watertight junction with the conduit, and a threaded interface. A second sleeve, featuring a corresponding seal and compatible threading, is configured to engage with the first sleeve. When the first and second sleeves are securely connected, they together enclose the connecting member ensure waterproofing of the conduit junction.

9 Claims, 6 Drawing Sheets

(56) References Cited

U.S. PATENT DOCUMENTS

| | | | | |
|---|---|---|---|---|
| 4,301,325 A | * | 11/1981 | Hutchison | H02G 3/088 206/568 |
| 4,341,922 A | * | 7/1982 | Bossard | H02G 15/013 174/92 |
| 4,487,462 A | * | 12/1984 | Gale | F16L 27/1274 439/92 |
| 5,600,094 A | * | 2/1997 | McCabe | H02G 3/0616 174/653 |
| 5,929,383 A | * | 7/1999 | Marik | H02G 15/04 439/98 |
| 6,106,031 A | * | 8/2000 | Guginsky | H02G 3/0683 285/379 |
| 6,715,803 B1 | * | 4/2004 | Pahl | F16L 25/08 285/302 |
| 6,872,886 B2 | * | 3/2005 | Kiely | H02G 3/0691 174/152 G |
| 7,946,862 B2 | * | 5/2011 | Schluter | H01R 4/64 439/100 |
| 8,979,590 B2 | * | 3/2015 | Magno | H02G 15/076 439/607.41 |
| 9,450,328 B2 | * | 9/2016 | Lindkamp | H01R 13/502 |
| 9,601,914 B2 | * | 3/2017 | Chiu | H02G 15/007 |
| 9,704,620 B2 | * | 7/2017 | Martins Neto | H02G 3/0675 |
| 9,906,007 B2 | * | 2/2018 | Klein | H02G 3/22 |
| 9,982,823 B1 | * | 5/2018 | Cornwall | F16L 21/08 |
| 2003/0010516 A1 | * | 1/2003 | Widman | H02G 9/06 174/650 |
| 2004/0069517 A1 | | 4/2004 | Olson | |
| 2005/0191910 A1 | * | 9/2005 | Bertini | H02G 15/22 439/676 |
| 2010/0183363 A1 | * | 7/2010 | Bartholoma | H02G 3/0616 403/259 |
| 2011/0089688 A1 | * | 4/2011 | Nahmias | F16L 25/0018 411/435 |
| 2011/0309611 A1 | * | 12/2011 | Smith | H02G 3/065 285/139.3 |
| 2015/0200530 A1 | * | 7/2015 | Chiu | H02G 15/013 174/653 |
| 2017/0276272 A1 | * | 9/2017 | Nakai | H02G 3/00 |
| 2019/0271415 A1 | * | 9/2019 | Navon | F16K 15/04 |
| 2019/0308047 A1 | * | 10/2019 | Hofmann | F16L 21/002 |

FOREIGN PATENT DOCUMENTS

| | | | | |
|---|---|---|---|---|
| CH | 699514 B1 | * | 3/2018 | F16L 21/022 |
| DE | 29908267 U1 | * | 7/1999 | F16L 5/06 |
| DE | 19825989 C1 | * | 11/1999 | F16L 25/0036 |
| DE | 10244481 A1 | * | 3/2004 | F16L 5/06 |
| DE | 202008002915 U1 | * | 6/2008 | F16L 5/06 |
| DE | 102019001136 A1 | * | 8/2019 | F16B 7/1463 |
| EP | 13148 A | * | 7/1980 | H02G 15/04 |
| EP | 3043101 A1 | * | 7/2016 | F16L 25/0045 |
| FR | 2290067 A1 | * | 5/1979 | |
| GB | 1330888 A | * | 9/1973 | |
| GB | 1495707 A | * | 12/1977 | F16J 15/028 |
| GB | 2040603 A | * | 8/1980 | H02G 15/04 |
| GB | 2074395 A | * | 10/1981 | H02G 15/04 |
| GB | 2280317 A | * | 1/1995 | H01R 4/64 |
| JP | 2007517167 A | * | 6/2007 | |
| KR | 100871166 B1 | * | 12/2008 | |
| WO | WO-2017153946 A1 | * | 9/2017 | H02G 15/013 |

\* cited by examiner

CONDUIT CONNECTION SYSTEM

CROSS REFERENCE OF RELATED APPLICATION

This application claims priority to United Kingdom Patent Application No. 2118999.8 filed, Dec. 24, 2021. The disclosure of the aforementioned priority application is incorporated herein by reference in its entirety.

TECHNICAL FIELD

The present invention relates to a conduit connection system and relates particularly, but not exclusively, to a conduit connection system used to contain electrical wires safely within a waterproof enclosure.

BACKGROUND

Connecting circular electrical conduit sections together around a factory or workshop is well known. A metallic conduit section would normally have a short male thread section at both ends that couples with a female connection ring/coupling to connect two sections together.

Although this method of connecting two conduit sections together is very simple, it has many problems if installed in a factory or workshop where high hygiene standards must be maintained or areas where uncontained liquids are in the vicinity. In areas such as these, it is important to ensure that the cables being protected by the conduits are free from any liquid entering.

Within a factory that deals with strict hygiene rules, such as those involved in the preparation of food and drink or pharmaceuticals, washing of machinery equipment occurs regularly, including the conduit system. This can cause water to enter the conduit system through loose threads or gaps between the conduit and the connection ring/coupling. If water gets trapped it can cause a stagnant pool creating a perfect environment for bacteria. However, this could also become a further hazard if the cables being protected are worn. Insulation around cables can degrade with time and wear or be damaged during an installation. Any water that entered could cause a short in the cable, causing the metallic conduit to become live. If touched, this would cause an electrical shock to the bystander if the system is not correctly electronically earthed. Therefore, water or any liquid must to be prevented from entering the system at all times.

BRIEF SUMMARY

Preferred embodiments of the present invention seek to overcome or alleviate the above-described disadvantages of the prior art.

According to an aspect of the present invention there is provided a conduit connection system comprising: a connecting member for connecting two or more sections of conduit and a plurality of seals for sealing the junction between said connecting member and the conduit; and a plurality of engaging members for respectively engaging the conduit sections and said connecting member and creating an electrical connection therebetween.

By providing a connecting member that forms a secure junction between two sections of conduit an electrical connection is formed therebetween. This connection enables an earth terminal or electrical ground to be connected along any point along the two sections of conduit with the safety aspect that the entire conduit connection system will also be grounded.

Having plurality of seals provides a waterproof barrier between the sections of conduit and the connecting member. This prevents moisture or liquids from entering the conduits between the overlapping sections. Using a plurality of engaging members ensures a strong mechanical joint between the conduit and the connection member.

In a preferred embodiment one of the first and second sleeves further comprises a third seal for sealing the junction between said first and second sleeves when they are in engagement. In another preferred embodiment, the engaging members comprise at least four engaging members for engaging the conduit sections and said connecting member. In a further preferred embodiment, the engaging members comprise grub screws. The seals are preferably O-Rings. In a preferred embodiment, the connecting member further comprises a rib on an internal surface in use for engaging ends of said conduit sections.

According to another aspect of the present invention there is provided a conduit connection system comprising: a connecting member for connecting two or more sections of conduit; a plurality of engaging members for respectively engaging the conduit sections and said connecting member and creating an electrical connection therebetween; a first sleeve having a first seal for sealing the junction between said first sleeve and the conduit and a first thread; and a second sleeve having a second seal for sealing the junction between said second sleeve and the conduit, and a second thread that engages said first thread, wherein when in engagement said first and second sleeves together enclose said connection member.

The application of a first and second sleeve further provides a waterproof and secured environment within the conduit sections, whilst also strengthening the junction between them. The sleeves can also be easily threaded together or taken apart for cleaning and maintenance.

In a preferred embodiment the first and second sleeves further comprises a third seal for sealing the junction between said first and second sleeves when they are in engagement. In another preferred embodiment, the seals are O-Rings. In a further preferred embodiment, the engaging members comprise at least four engaging members for engaging the conduit sections and said connecting member. The engaging members may comprise grub screws. In a preferred embodiment, the connecting member further comprises a rib on an internal surface in use for engaging ends of said conduit sections.

According to a further aspect of the present invention there is provided a conduit connection system comprising: a connecting member for connecting two or more sections of conduit, wherein said connecting member has a contact thread; plurality of engaging members for respectively engaging the conduit sections and said connecting member and creating an electrical connection therebetween; first sleeve having a first seal for sealing the junction between said first sleeve and the conduit and a first thread that engages said a first part of said contact thread; and a second sleeve having a second seal for sealing the junction between said second sleeve and the conduit, and a second thread that engages a second part of said connecting member thread, wherein when in engagement said first and second sleeves together enclose said connection member.

In a preferred embodiment, a third seal is used on the second sleeve for sealing the junction between the second sleeve and enclosure when enclosed. In another preferred embodiment, the seals are O-Rings. In a further preferred embodiment a plurality of engaging members are used. The engaging members may comprise grub screws. In a preferred embodiment, the connecting member further comprises a rib on an internal surface in use for engaging ends of said conduit sections.

According to an additional aspect of the present invention there is provided a conduit connection system comprising: a first connecting member having a first thread portion and second thread portion; at least one engaging member for respectively engaging the conduit section and said connecting member and creating an electrical connection therebetween; a first sleeve having a first thread that engages said first thread portion; a second sleeve having a first seal for sealing the junction between said second sleeve and the conduit and a second seal for sealing the junction between the said second sleeve and the enclosure and a second thread that engages said second thread portion, wherein when in engagement said first and second sleeves together enclose said connection member; and a second connecting member for connecting said second sleeve to electrical ground.

Inclusion of a second connecting member that connects to electrical ground ensures a good earth continuity between the conduits and enclosure. In a preferred embodiment, the seals are O-Rings. In another preferred embodiment, the engaging members comprise grub screws.

BRIEF DESCRIPTION OF THE DRAWINGS

Preferred embodiments of the present invention will now be described, by way of example only, and not in any limitative sense with reference to the accompanying drawings in which.

DETAILED DESCRIPTION

Figure 1:
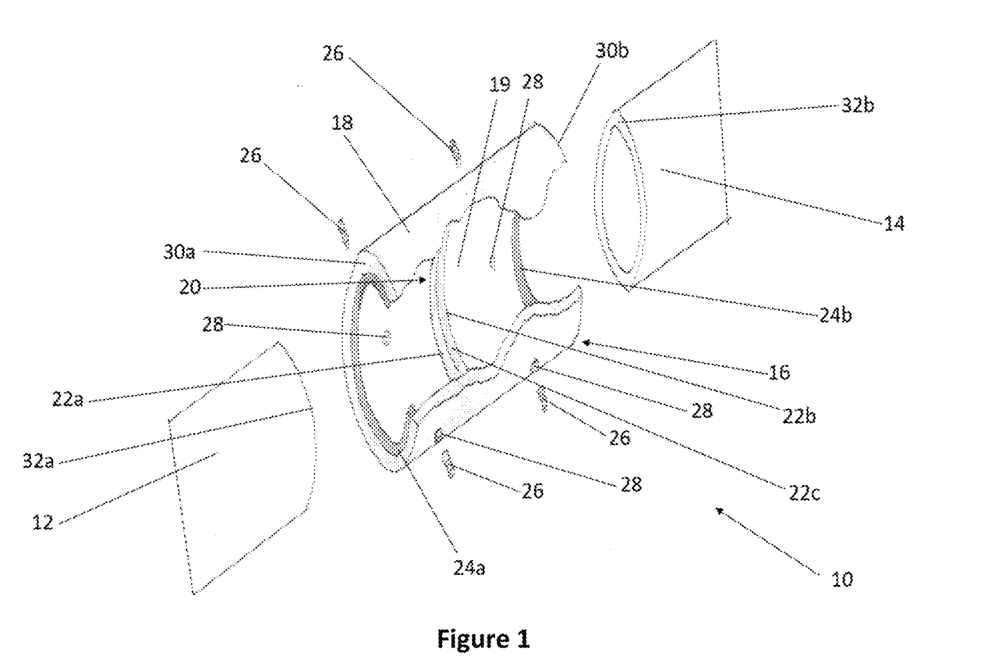
FIG. 1 is a partial cutaway perspective view of a conduit connection system of a first embodiment of the present invention.

Referring initially to FIG. 1, a conduit connection system 10 is provided for connecting a first and a second conduit, 12 and 14 respectively, using a connecting member 16. The connecting member 16 is cylindrical in shape with a hollow core. It comprises a cover 18 and a rib 20 protruding from the inner surface 19 of the cover. The rib 20 has two surfaces, interfaces 22a and 22b that protrude from the inner surface 19 and a third surface, interface 22C connecting therebetween. Interfaces 22a and 22b lie perpendicular to the surface 19 with interface 22c being shorter than the length of the connecting member 16. The cover 18 has a set of apertures 28 that allow insertion of engaging members, in the form of grub screws 26, within two threaded apertures situated on either side of the rib 20. At each end of the connecting member 16 is a connecting member edge, 30a and 30b. Each edge within the inner surface 19 has a seal, 24a and 24b that surrounds the opening and seals against the conduit sections 12 and 14. This opening enables the first and second conduits to enter with their end edge faces, 32a and 32b presented parallel to interfaces 22a and 22b.

Figure 2:
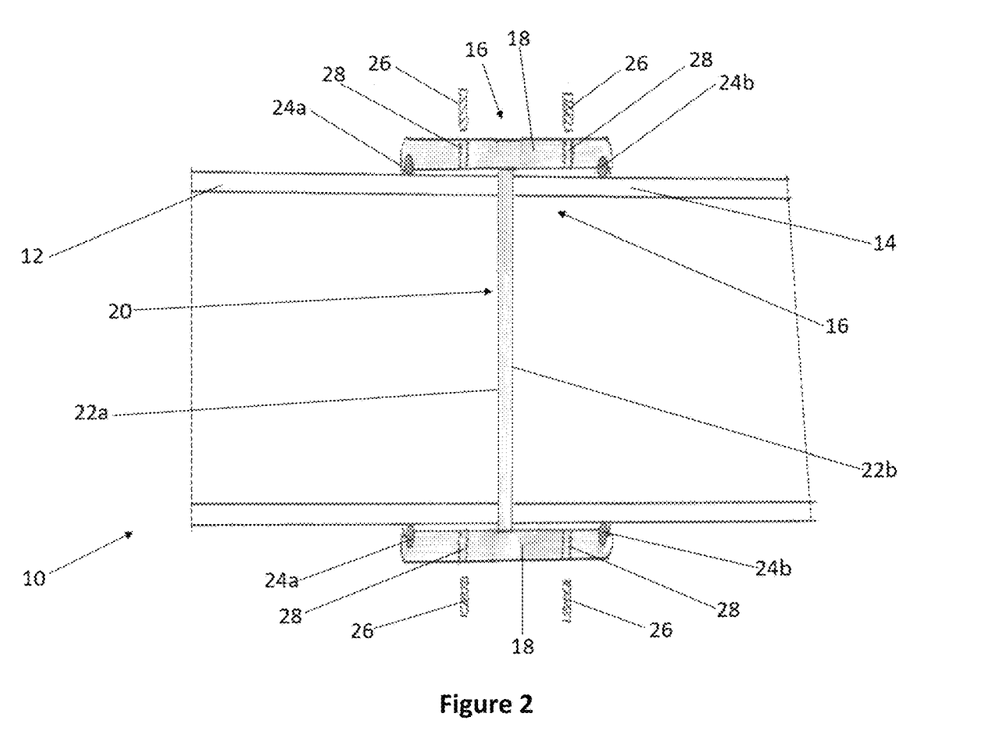
FIG. 2 is a sectional side view of the connection system of FIG. 1.

FIG. 2 shows the conduit connection system 10 as assembled. The first conduit section 12 is inserted into the connecting member 16 through the opening at connecting member edge 30a. As the conduit is directed through the connecting member 16, the conduit edge face 32a makes contact with interface 22a. The rib 20 prevents the first conduit 12 moving further through the connecting member 16 with the interface 22a and conduit edge face 32a creating a junction 22a therebetween. The seal 24a creates a waterproof seal between the outer surface of the conduit 12 and inner surface 19 of the connecting member.

The second conduit section 14 is similarly inserted through the opposite opening at the connecting member edge 32b. In this case, the second conduit edge face 32b creates a junction with the interface 22b on the rib 20. The junctions 22a and 22b form an important connection between the connecting member 16 and the first and second conduit sections, 12 and 14. This connection is mechanically secured by the grub screws 26 that thread through each aperture 28 making contact with the outer surface of both the first and second conduit sections. The grub screws 26 slightly bore into the first and second conduit sections preventing movement between the cover 18 and the conduit surface and thus creating a strong mechanical joint. This connection is further secured and made waterproof by the seals 24a and 24b.

The connections made at the junctions 22a and 22b are of particular importance for the conduit connection system 10 as a result of the system 10 being used to enclose wires. These junctions create an electrical connection between the two conduit sections and the connecting member 16, such that the conduit sections and connecting member can be electrically grounded at a further point along the system (not shown). This provides an electrical ground continuity as a safety feature in case a wire enclosed had its insulating layer damaged. If any part of the live wire was to make contact with the first or second conduit sections, 12 and 14 or the connecting member 16 it would be safely grounded. This electrical continuity is further enhanced by the use of the grub screw 26 which create another connection between the conduit sections and the connecting member 16. In the event that the interfaces 22a and 22b are not complete, metal-to-metal connections the grub screws ensure that electrical connection. A further safety feature of the conduit connection system 10 is made by the seals 24a and 24b. These seals provide a waterproof barrier between the outer surface of the conduit and the inner surface of the connecting member therefore preventing moisture or liquid from entering the conduit or enclosed wires during an external wash-down.

Figure 3:
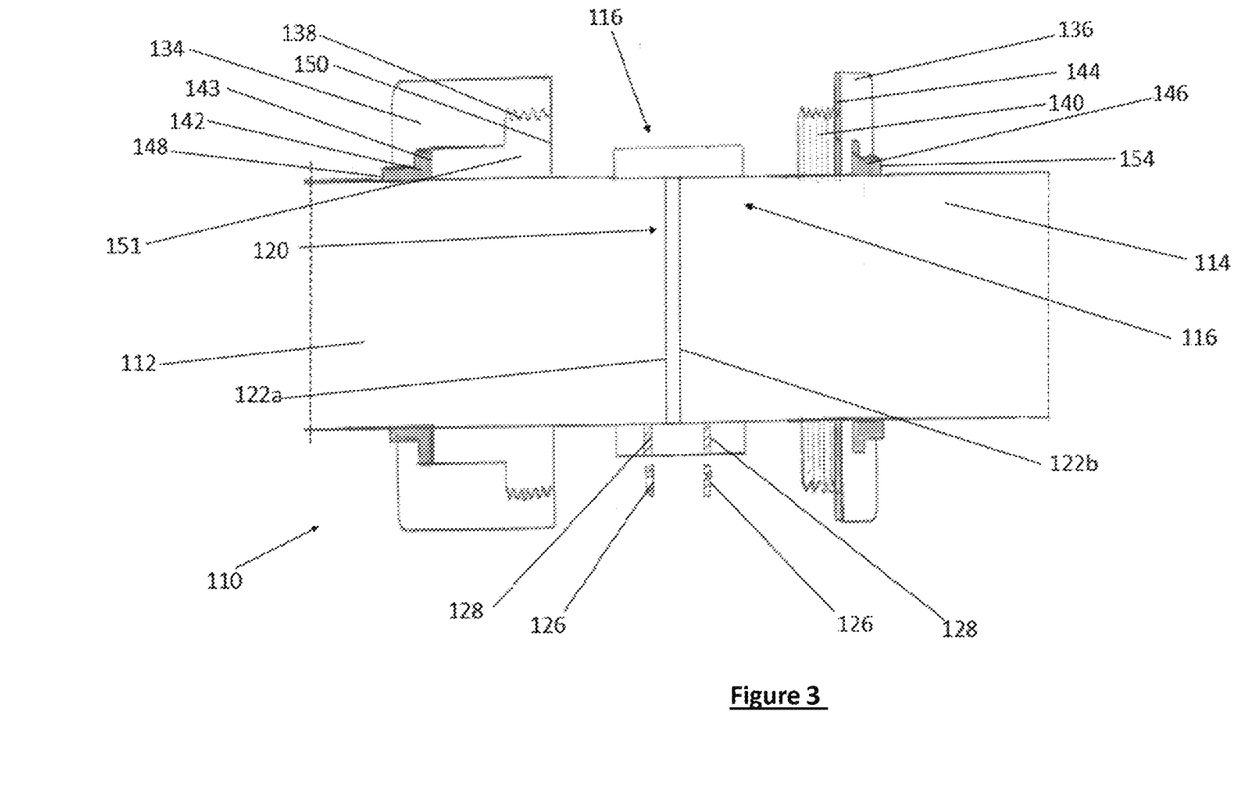
FIG. 3 is a sectional side view of a conduit connection system of a second embodiment of the present invention.
Figure 4:
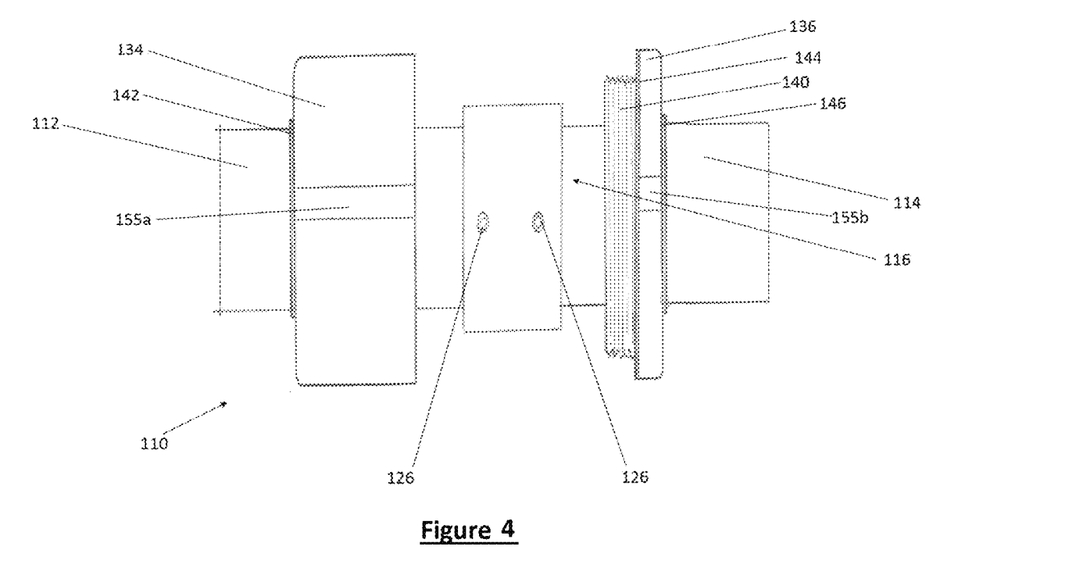
FIG. 4 is a partially assembled side view of the connection system of FIG. 3.
Figure 5:
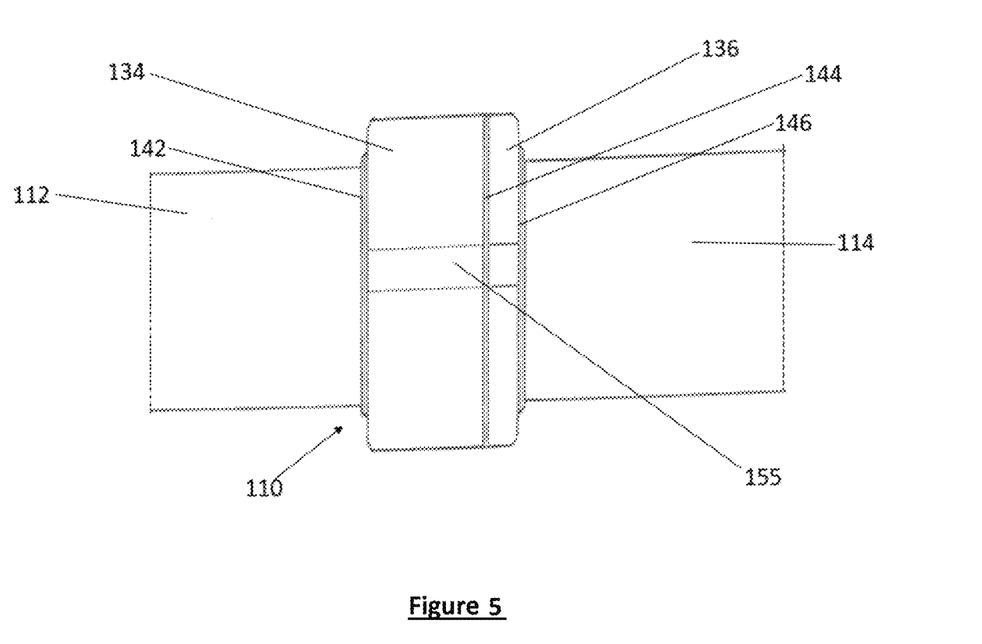
FIG. 5 is an assembled side view of the connection system of FIG. 4.

Referring now to FIGS. 3 to 5, in which components equivalent to those in FIGS. 1 and 2 have been identified with like reference numerals increased by 100, the conduit connection system 110 includes a first conduit 112, a second conduit 114, a connecting member 116, a first sleeve 134 and a second sleeve 136. Similar to the first embodiment the first and second conduit each create a junction, 122a and 122b at the rib 120. The connecting member 116 is secured to the first and second conduit, 112 and 114, by four grub screws 126. The grub screws 126 are threaded through the connecting member 116 making a reliable connection with the outer surface of the conduits via their corresponding apertures 128. This connection ensures electrical continuity between the conduit members.

Further to the connecting member 116 are a pair of threaded sleeves, one on either side thereof. Both the first 134 and second sleeve 136 are cylindrical in shape having apertures that fit over the first and second conduit sections, 112 and 114.

The first sleeve 134 has a first aperture that extends in length from one end of the sleeve to the other, with the first aperture 148 having a smaller diameter than a second aperture 150. The first aperture 148 includes a first seal 142 that runs along the outer edge providing a waterproof barrier between the opening at the first aperture 148 and the first conduit 112. The second aperture 150 has an opening large enough to cover the length and height of the connecting member 116, from the inner edge 143 of the seal to the second aperture 150 and is therefore above to enclose the length of the connecting member 116. As a result, the connecting member 116 has enough room to sit within a recess 151 when assembled. Along the edge of the second aperture 150 is a first (internal) thread 138 that corresponds to a second (external) thread 140 located on the second sleeve 136. In use, the first thread 138 is positioned above the connecting member, with enough room for the corresponding second thread 140 to affix onto the first thread 138 when assembling.

The second sleeve 136 has an aperture large enough to fit over the second conduit 114 and has a short recess under the second threaded portion 140 which receives a section of the connecting member 116. However, this recess is not essential and the second sleeve can abut the connecting member 116. At the edge of the second sleeve, adjacent the first sleeve, is a second thread 140 that corresponds to the first thread on the first sleeve 134. At the other edge of the second sleeve is the fourth aperture 154 that has a third seal 146 surrounding the outer edge of this aperture, creating another waterproof barrier between the second sleeve 136 and the second conduit section 114. A second seal 144 also on the second sleeve creates a secure barrier between the first sleeve 134 and second sleeve 136 when they are threaded together once assembled.

FIGS. 4 and 5 shows the assembly of the second embodiment. The connecting member 116 secures the two ends of the first and second conduit, 112 and 114, using a plurality of grub screws 126. When directing the first sleeve 134 and the second sleeve 136 along the first and second conduit, tightening portions 155a and 155b (which are flat spots on the otherwise circular circumference of the outsides of the sleeves) are used to move, and then secure the sleeves together. This enables a person to securely tighten the first and second sleeve together so that a good connection is made between the second seal 144 and the first sleeve 134. When fully assembled the first and second sleeves create a secured and waterproof connection around the connecting member. This further increases safety for the wires enclosed within the conduit but also provides access to the conduit member by loosening the sleeves via the tightening portions, 155a and 155b.

When assembling the conduit system 110 it is generally preferable to position the first and second sleeve on to the first and second conduit before attaching the connecting member 116. This enables the sleeves to be pushed back enough to secure the two conduit sections together with the connecting member 116 and ensure a good electrical connection between them. However, depending on the length of the conduit sections, the connecting member could be attached first and the sleeves inserted through the opposing ends of the conduit sections.

Figure 6:
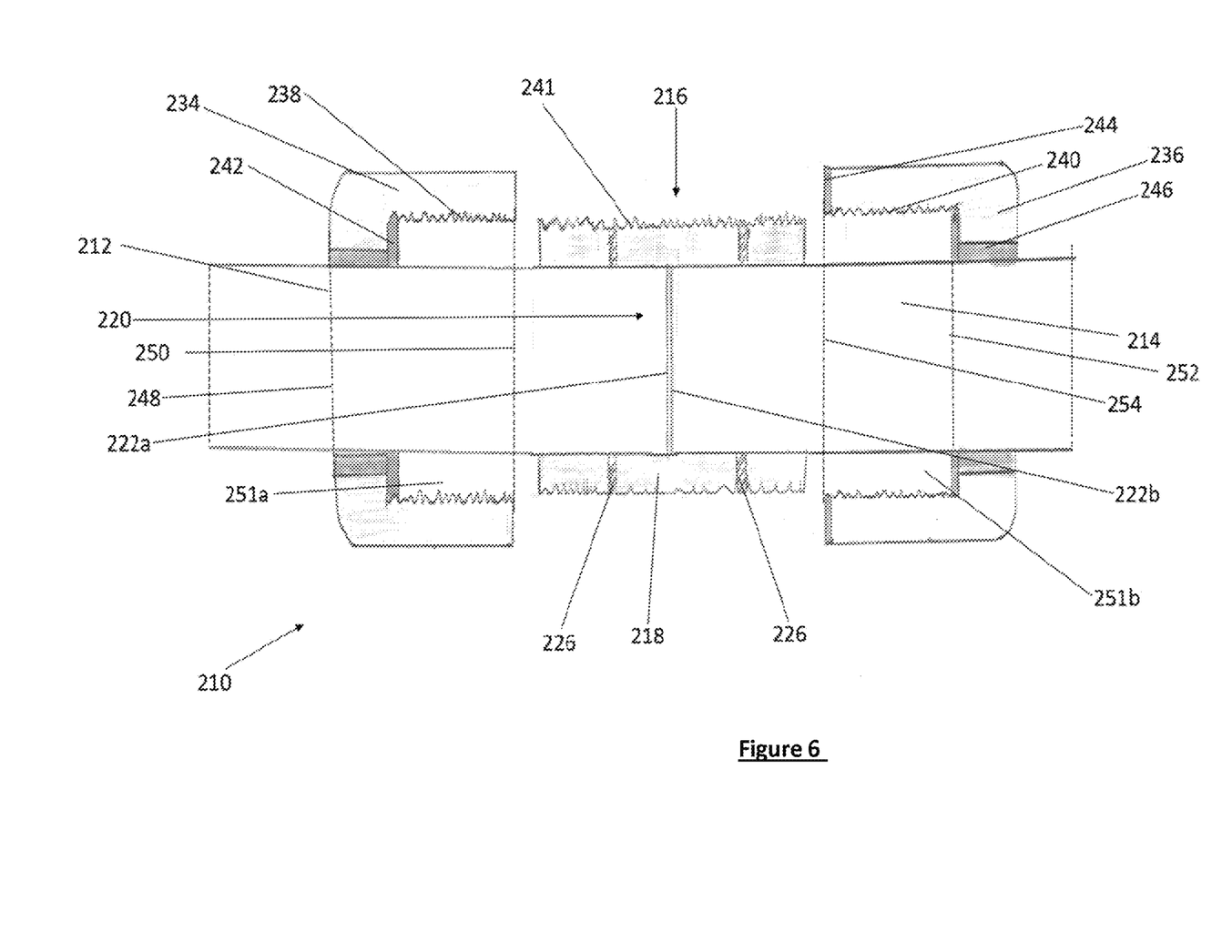
FIG. 6 is a sectional view of a connection system of third embodiment of the present invention.

Referring now to FIG. 6, in which components equivalent to those in FIGS. 3 to 5 have been identified with like reference numerals increased by 100, the conduit connection system 210 includes a first conduit 212, a second conduit 214, a connecting member 216 and a first and second sleeve, 234 and 236 respectively. Similar to the first and second embodiments the connecting member 216 is used to secure the first and second conduits together at the junctions 222a and 222b at the rib 220. Grub screws 226 are threaded through the cover 218 on the connecting member 216 to keep the connecting member and both conduits secured together as well as ensuring electrical continuity between the conduit sections. Contrasting to the previous embodiments the cover 218 on the connecting member 216 has an external thread 241. This external thread 241 corresponds to a first (internal) thread 238 located on the first sleeve 234 and the second (also internal) thread 240 on the second sleeve 236.

Similar to the first sleeve 134 in the second embodiment, the first sleeve 234 also has an aperture that the first conduit 212 feeds through. With the conduit entering a first aperture 248 and exiting through a second aperture 250. The first aperture is wide enough to fit the conduit and a first seal 242, whilst the second aperture 250 is larger and is located adjacent the connecting member 216. The second aperture 250 contains a recess 251a (when the conduit has been inserted through the sleeve, a recess is formed) and the first thread, which extends along the length of the recess 251a and corresponds to the external thread 241 on the connecting member 216.

The second sleeve 236 in this embodiment is identical to the first sleeve 234 and also contains an aperture that fits over the second conduit 214. The conduit enters through a fourth aperture 252 and exits via a third aperture 254. The third aperture 254 is larger than the fourth aperture 252 and contains a second (internal) thread 240 and a further recess 251b (when the conduit has been inserted through the sleeve). The second thread lines the length of the third aperture and corresponds to the external thread 241 on the connecting member 216. At the edge of the third aperture 254 adjacent the connecting member is a second seal 244 that provides a waterproof fit when the first and second sleeve are assembled. A third seal 246 is located at the fourth aperture 252 and seals the gap between the second conduit 214 and the second sleeve 236 at this location.

Assembly of the conduit connection system 210 in this embodiment is analogous to the assembly of the conduit connection system in the second embodiment. However, in this embodiment both the first and second sleeves, 234 and 236, thread directly onto the connecting member 216. In this example both the first and second sleeve thread halfway along the external thread 241. However, it would also work if a larger portion of the external thread 241 was occupied by either the first or second sleeve. For example, the first sleeve 234 could thread across 75% of the external thread 238 and the second sleeve covered 25%. This could be considered if the recess 251a of the first sleeve was long enough to occupy the extended length of the external thread 238 of the connecting member 216.

Figure 7:
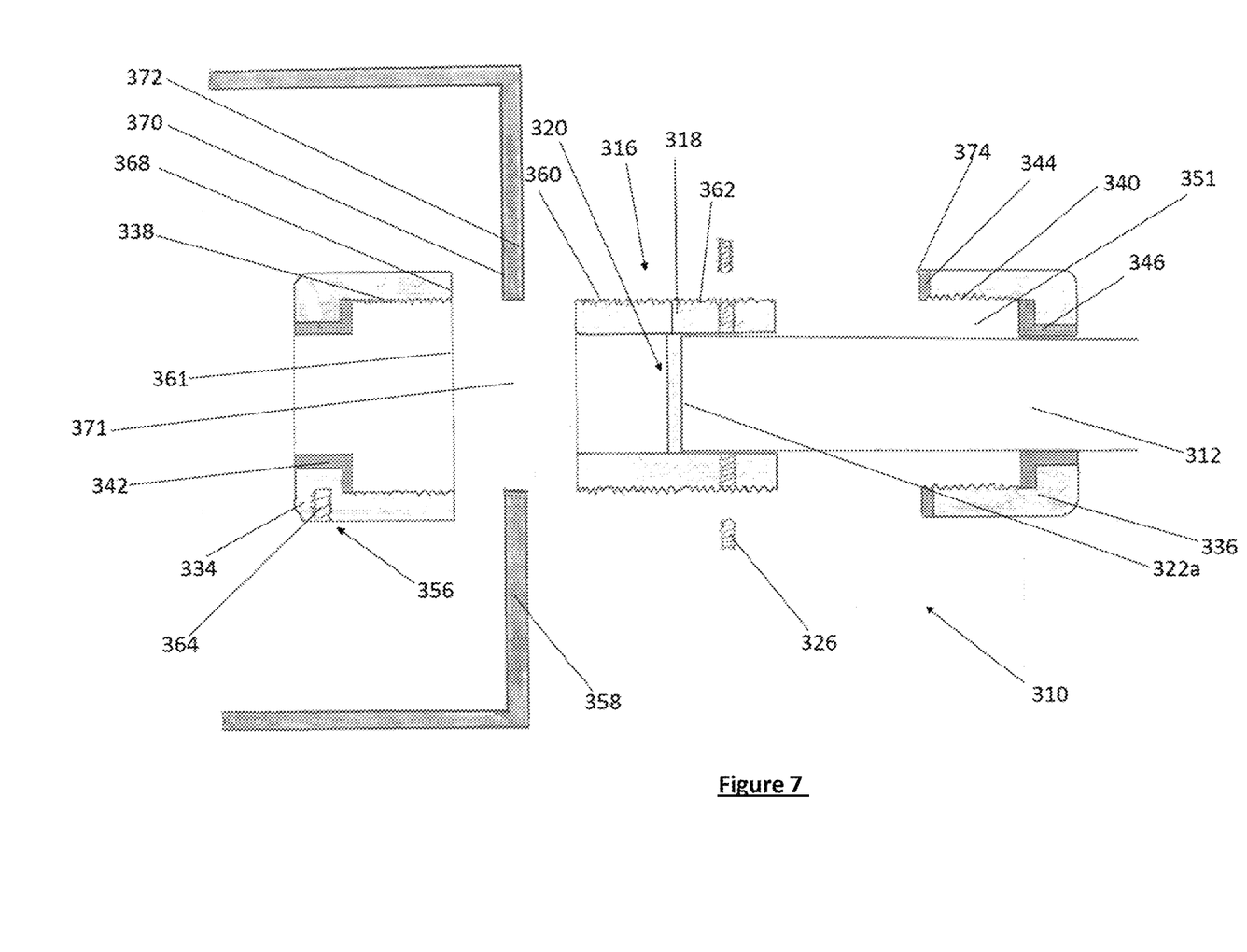
FIG. 7 is a sectional view of a connection system of fourth embodiment of the present invention.
Figure 8:
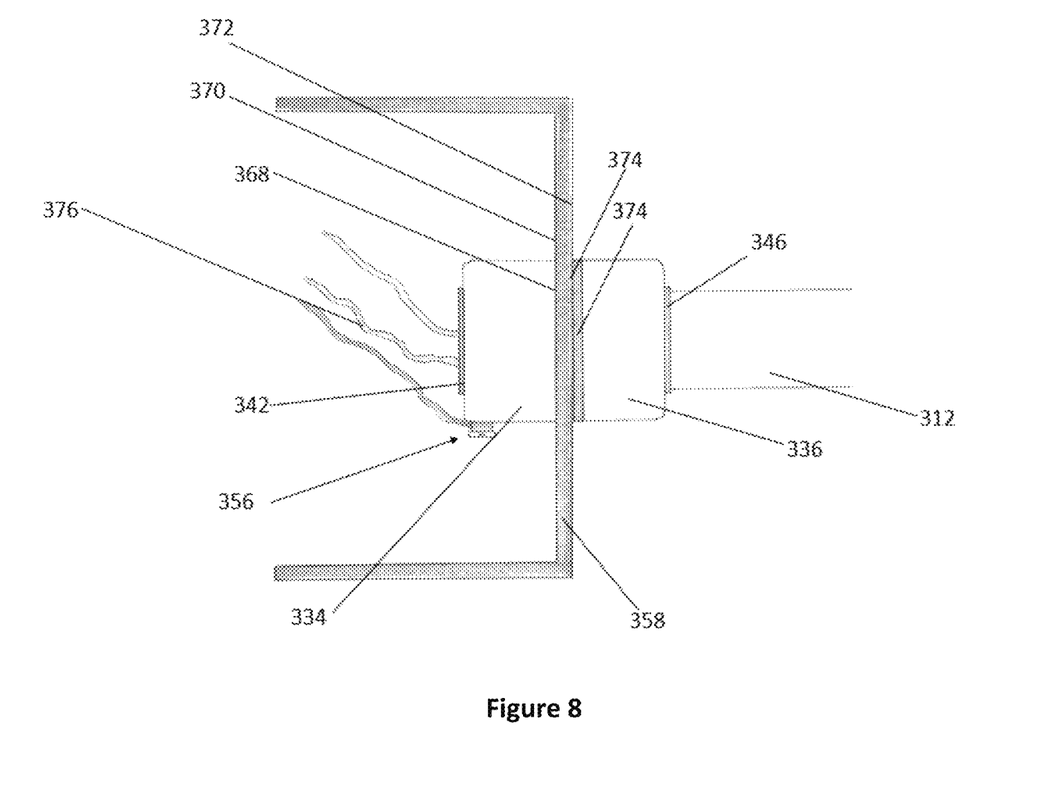
FIG. 8 is an assembled cut away view of the connection system of FIG. 7.

Referring now to FIGS. 7 to 8, in which components equivalent to those in FIG. 6 have been identified with like reference numerals increased by 100, the conduit connection system 310 includes a conduit section 312, the apparatus illustrated in this embodiment differs from those previously described as it is a junction between a conduit section and an enclosure rather than between two conduit sections. The main components of this embodiment are a connecting member 316, a first and second sleeve 334 and 336 respectively, and an enclosure 358. The connecting member 316 operates similarly to that in the third embodiment by engaging a conduit section 312 and creating a junction 322a between the conduit section 312 and a rib 320, located within the connecting member 316. When secured by a plurality of grub screws 326 an electrical connection is formed between the conduit section 312 and the connecting member. A first thread portion 360 and a second thread portion 362 are also located on the cover 318 and correspond to the threads on the first and second sleeves.

The first sleeve 334 is cylindrical in shape and has a first aperture 361 extending from a first sleeve surface 368. It includes a first seal 342 and a first thread 338, the first thread corresponding to the first thread portion 360 on the cover 320 of the connecting member 316. In addition, the first sleeve 334 also incorporates a second connecting member, which in this case is an earth terminal 356. The earth terminal 356 includes a threaded recess 364. The first sleeve is located within an enclosure 358. The enclosure also includes a second aperture 371, having an equivalent diameter to the first aperture 361, an inner enclosure surface 370 and an outer enclosure surface 372.

The second sleeve includes an aperture, second sleeve surface 374, a second thread 340, and a second and third seal, 344 and 346 respectively. The conduit section is directed through the aperture of the second sleeve creating a recess 351 between the second sleeve surface 374 and the third seal 346.

FIG. 8 illustrates the full assembly of the conduit connecting system 310. The connection member is first attached to the conduit section 312 by insertion of the conduit into the connection member and fixing it thereto by the use of the grub screws 326. This ensures a good electrical connection between the connection member 316 and the conduit 312 and this leads to electrical continuity with all of the components, including the enclosure 358, once the connecting member is engaged with the first sleeve 334. The first sleeve 334 lies against the enclosure wall, with the first sleeve surface 368 making contact with the inner enclosure surface 370. To enable access from the outside of the enclosure 358 into the first sleeve 334 the first aperture 361 and the second aperture 371 are aligned. The connecting member 316 is directed through the second aperture 371 enabling the first thread portion 360 to be threaded into the first thread 338 of the first sleeve 334. The second thread portion 362 of the connecting member 316 is likewise threaded onto the second thread 340 of the second sleeve 336. Once this connection has been tightened the second sleeve surface will make contact with the outer enclosure surface 372, with second seal 344 creating a secure and waterproof connection between the enclosure 358 and connecting member 316.

When cables 376 are passed through the conduit system 310, they are protected from exiting the first sleeve 334 by the first seal 342. Further protection installed on the first sleeve is located at the earth terminal 356 to which earth wires can be attached. This facilitates a good electrical earth continuity at the first sleeve, through the enclosure and the conduit section preventing an electrical shock from any live wires touching any of the metal surfaces throughout the system.

It will be appreciated by persons skilled in the art that the above embodiments have been described by way of example only and not in any limitative sense, and that various alterations and modifications are possible without departure from the scope of the protection which is defined by the appended claims. For example, the engaging members could also include a different type of screw such as a set screw or a flat headed bolt. Another example is the seals could be of the type O-rings made from materials such as rubber or silicon.

The invention claimed is:

1. A conduit connection system comprising:
a connecting member for connecting two or more sections of conduit;
a plurality of recessed threaded engaging members extending through said connecting member and respectively engaging the two or more conduit sections and said connecting member and creating an electrical connection therebetween;
a first sleeve having a first seal compressed between one end of said connecting member and an inner surface of said first sleeve, said first seal extending out to an outer surface of said first sleeve for sealing a junction between said first sleeve and the conduit and said first sleeve having a first thread; and
a second sleeve having a second seal compressed between an opposing end of said connecting member and an inner surface of said second sleeve, said second seal extending out to an outer surface of said second sleeve for sealing another junction between said second sleeve and the conduit, and a second thread that engages said first thread, wherein when in engagement said first and second sleeves together enclose said connection member and said recessed threaded engaging members, and wherein one of said first and second sleeves further comprises a third seal for sealing a third junction between said first and second sleeves when they are in engagement.

2. The conduit connection system according to claim 1, wherein said plurality of recessed threaded engaging members comprise at least four engaging members for engaging the two or more conduit sections and said connecting member.

3. The conduit connection system according to claim 1, wherein said connecting member further comprises a rib on an internal surface in use for engaging ends of two or more said conduit sections.

4. A conduit connection system comprising:
a connecting member for connecting two or more sections of conduit, wherein said connecting member has a connecting member thread;
a plurality of recessed threaded engaging members for respectively engaging the two or more conduit sections and said connecting member and creating an electrical connection therebetween;
a first sleeve having a first seal compressed between one end of said connecting member and an inner surface of said first sleeve, said first seal extending out to an outer surface of said first sleeve for sealing a junction between said first sleeve and the conduit and said first sleeve having a first thread that engages a first part of said connecting member thread; and
a second sleeve having a second seal compressed between an opposing end of said connecting member and an inner surface of said second sleeve, said second seal extending out to an outer surface of said second sleeve for sealing another junction between said second sleeve and the conduit, and said second sleeve having a second thread that engages a second part of said connecting member thread, wherein when in engagement said first and second sleeves together enclose said connection member and said recessed threaded engaging members, and wherein one of said first and second sleeves further comprises a third seal for sealing a third junction between said first and second sleeves when they are in engagement.

5. The conduit connection system according to claim 4, wherein said plurality of recessed threaded engaging members comprise at least four engaging members for engaging the two or more conduit sections and said connecting member.

6. The conduit connection system according to claim 4, wherein said connecting member further comprises a rib on an internal surface in use for engaging ends of said two or more conduit sections.

7. A system for connecting a section of conduit to an enclosure, the system comprising:
 a first connecting member having a first thread portion and second thread portion;
 a plurality of recessed engaging members for respectively engaging the conduit section and said first connecting member and creating an electrical connection therebetween;
 a first sleeve having a first thread that engages said first thread portion;
 a second sleeve having a first seal compressed between one end of said connecting member and an inner surface of said first sleeve, said first seal extending out to an outer surface of said second sleeve for sealing a junction between said second sleeve and the conduit and said second sleeve having a second seal for sealing another junction between said second sleeve and the enclosure and a second thread that engages said second thread portion, wherein when in engagement said first and second sleeves and said enclosure together enclose said first connection member; and an earthing connector for connecting said first sleeve to electrical ground.

8. The system according to claim 7, wherein a plurality of recessed engaging member are used.

9. The system according to claim 7, wherein said first connecting member further comprises a rib on an internal surface in use for engaging ends of said conduit section.

* * * * *